Dec. 27, 1966 C. F. AULT ETAL 3,295,117

POSITION SENSING APPARATUS

Filed March 21, 1963 2 Sheets-Sheet 1

INVENTORS C.F. AULT
S.F. RISE III
BY Kenneth B. Hamlin
ATTORNEY

Dec. 27, 1966 C. F. AULT ETAL 3,295,117

POSITION SENSING APPARATUS

Filed March 21, 1963 2 Sheets-Sheet 2

United States Patent Office 3,295,117
Patented Dec. 27, 1966

3,295,117
POSITION SENSING APPARATUS

Cyrus F. Ault, Lincroft, and Samuel F. Rise III, Englishtown, N.J., assignors to Bell Telephone Laboratories, Incorporated, New York, N.Y., a corporation of New York Filed Mar. 21, 1963, Ser. No. 266,961
9 Claims. (Cl. 340—174.1)

This invention relates to electromagnetic sensing devices and more particularly to such devices for use in position sensing apparatus and in displacement detection arrangements.

In the field of magnetic recording and reproduction, as well as in many other areas, it is often desired to determine accurately the position of a first device or equipment, such as a magnetic storage medium, with respect to the location of a second device or equipment, such as a magnetic transducer head. Thus, when information is to be recorded in a predetermined location on a storage medium, circuitry must be provided to sense when the predetermined location is adjacent the record transducer. Similarly, when recorded information is to be reproduced from a certain location on the medium it is necessary to sense that this location is adjacent the read transducer.

Such position sensing must be effected with a particularly high degree of accuracy where the storage medium comprises a plurality of discrete cells of magnetic material, each of which is selectively magnetized in accordance with the charater of the binary bit stored therein. A storage medium of this type is disclosed, for example, in S. M. Shackell application Serial No. 708,127, filed January 10, 1958, and in an article entitled "A Card-Changeable Permanent-Magnet-Twistor Memory of Large Capacity," published in the "I.R.E. Transactions on Electronic Computers," vol. EC–10, pages 451–461, September 1961. Therein memory circuit arrangements are shown for providing storage of information through the use of removable cards having a plurality of small bar magnets bonded or deposited thereon. The cards are situated in the memory so that each bar magnet is in the proximity of a respective magnetic cross point element. If a magnet is in a magnetized condition the respective memory crosspoint element is thus biased by the static magnetic field of the magnet. When an interrogation signal is applied to a memory crosspoint, in the absence of a static magnetic field, an output signal is generated representative of a bit of one binary character. The presence of a static magnetic field due to a bar magnet, however, inhibits generation of an output signal from a crosspoint, which is representative of a bit of the other binary character. Accordingly, information is stored in the memory by selectively magnetizing the card magnets in a pattern in accordance with the binary bits of information to be stored. In the S. M. Shackell application the magnetic crosspoint elements are magnetic cores whereas in the above-mentioned "I.R.E. Transactions" article the magnetic crosspoint elements are bit addresses of wire memory elements of the type disclosed in the copending application of A. H. Bobeck, Serial No. 675,522, filed August 1, 1957, now U.S. Patent No. 3,083,-353, which wire memory elements are generally known as twistors.

The magnets on each card in the above-described memories are arranged in closely-spaced rows and columns, each row corresponding to a word of information and each magnet corresponding to a binary bit thereof. In addition, the magnet cards advantageously include a plurality of additional magnets bonded or deposited thereon. Each additional magnet is individually associated with a row of bit magnets and is accurately located with respect thereto on the card. As will be described in detail below, the additional magnets are advantageously utilized in the present invention for positioning, or locating, the magnet cards with respect to recording circuitry during information storage operation.

Apparatus for storing information on the magnet cards one word at a time, that is, for selectively magnetizing the bar magnets of one row of bit magnets at a time, is shown in C. F. Ault-D. Friedman-R. H. Granger-J. J. Madden application Serial No. 266,962, filed March 21, 1963. Therein the rows of bit magnets on each card are sequentially presented to a row of magnetic record transducers which must be accurately positioned with respect to the magnets for recording. Position sensing apparatus in accordance with the present invention may advantageously be utilized to indicate to the recording circuitry precisely when the row of record transducers is adjacent a row of magnets in which information is to be stored. It is necessary that the position sensing be accomplished with considerable accuracy to minimize the possibility of the recording field of the transducers from infringing upon other rows of magnets, and to ensure that sufficient of the recording field is provided to the proper magnets to magnetize them to a desired dipole saturation. Such accuracy must be maintained despite small variations which may occur in the length of the card magnets due to the edges thereof being worn away or the like. Such variations may arise, for example, during construction of the magnet cards where etching techniques are employed.

It is advantageous, moreover, that the position sensing be effected without substantial alteration of the magnet cards and with a minimum of additional apparatus or circuitry. Further, it is also advantageous that the sensing apparatus be simple and economical in construction, and that the position indication provided thereby to the recording circuitry be such as to operate simple amplitude-detection circuitry.

Accordingly, it is an object of this invention to provide a simple, compact and economical sensing device for determining the relative position between two or more objects.

More particularly, it is an object of this invention to provide a simple, compact and economical device for accurately sensing the position of a transducer relative to a magnetic storage medium.

A further object of this invention relates to a sensing device for deriving a position indication from a magnet associated with the position.

Another object of this invention is to provide a sensing device for determining the center of a bar magnet independently of the edges thereof.

It is a still further object of this invention to provide a sensing device for accurately locating the centerpoint of a line between dipoles of a saturated magnetic material.

Yet another object of this invention relates to a sensing device for providing a position indication suitable for operating amplitude-detection output circuitry.

In accordance with a specific embodiment of our invention, the above and other objects are attained through the use of an electromagnetic sensing device which accurately detects a magnet associated with a position to be sensed. Thus, in recording information on magnet cards employed in the above-mentioned memory arrangements, for example, the additional, or positioning, magnets on the magnet cards are utilized advantageously for indicating the position of the associated rows of bit magnets with respect to a plurality of record transducers. As relative motion is imparted between the record transducers and successive rows of bit magnets during recording, a sensing device in accordance with the principles of the present invention detects the center of each positioning magnet to trigger the recording of information in the associated row of bit magnets. The sensing device comprises three leg members of magnetic material which define two signal translating gaps separated by a distance substantially equal to the distance between magnetic dipoles of the magnet to be sensed. A single output winding is serially coupled to both signal translating gaps.

The two signal translating gaps are situated longitudinally along the line of relative motion between the sensing device and the magnets associated with the positions to be sensed; that is to say, the line of relative motion between the sensing device and the position magnets is in a direction perpendicular to the width of the signal translating gaps. Relative motion between the sensing device and a magnet is such that the sensing device is successively adjacent the respective dipoles of the magnet. A position-indicating pulse of predetermined polarity is thereby induced in the output winding only when the signal translating gaps of the sensing device are respectively centered adjacent the magnetic dipoles of the magnet, and therefore accurately positioned with respect to the position associated with the magnet. The position-indicating pulse is thus derived jointly from both magnetic dipoles of the magnet, thereby accurately locating the center of the magnet independent of variations in the length of the magnet. The pulse may be employed advantageously to operate amplitude-detection circuitry for utilization purposes, such as to effect the recording of information in the above-mentioned Ault-Friedman-Granger-Madden application.

It is accordingly a feature of this invention that position-sensing apparatus comprise a magnet fixedly associated with a position to be sensed and a sensing device including a pair of intercoupled signal translating gaps for providing an output pulse only when the sensing device is centered over the magnet.

Another feature of this invention relates to a device for sensing the center of a line between dipoles of a magnetic material comprising three leg members of magnetic material defining two adjacent signal translating gaps separated by a distance substantially equal to the distance between dipoles of the magnetic material and common output circuitry coupled to both of the gaps.

The above and other objects and features of the present invention may be better understood upon consideration of the following detailed description and the accompanying drawing in which.

An important aspect of the present invention, as mentioned above, relates to circuitry for accurately determining the position of a first object or equipment relative to the position of a second object or equipment. The illustrative embodiment set forth herein for purposes of describing the invention is concerned with sensing the position of a magnetic recording medium relative to magnetic recording circuitry. However, it will be apparent that the principles of our invention may be employed to advantage in a wide variety of applications, for example in positioning arrangements for assembly and tooling operations. Further, a sensing device in accordance with our invention may be utilized advantageously in displacement detection arrangements to indicate displacement or disposition relative to a predetermined reference.

Figure 1:
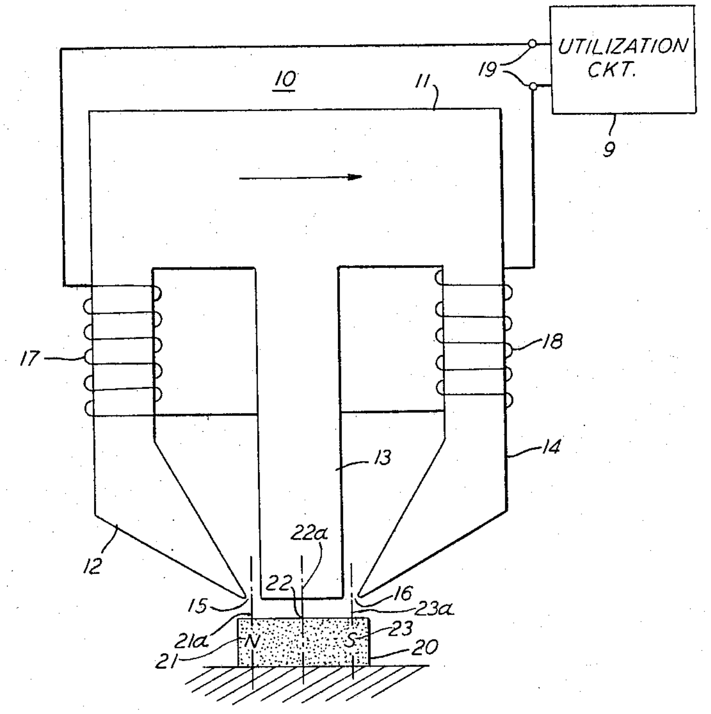
FIG. 1 is a representation of an illustrative embodiment of a sensing device in accordance with the principles of our invention.

Referring more particularly now to FIG. 1 of the drawing, a sensing device 10 in accordance with the principles of our invention is shown comprising a three-legged, or E-shaped, core of magnetic material 11 having three leg members 12, 13 and 14. Core 11 may be of laminated construction of any of the well-known magnetic materials suitable for magnetic recording and reproducing purposes. For example, a sensing device 10 constructed of eight laminations of 4 mil 4–79 Permalloy may be employed advantageously in the illustrative embodiment of FIG. 3 described below. Leg member 12, 13 and 14 of sensing device 10 define a pair of adjacent signal translating gaps 15 and 16. Individual signal translating coils 17 and 18 disposed on leg members 12 and 14, respectively, are serially interconnected to form a common output winding connected to terminals 19, and thence to utilization circuit 9.

As illustrated in FIG. 1 by way of example, sensing device 10 is employed to sense the position of a permanent bar magnet 20, the magnetic dipoles 21 and 23 of which are respectively indicated by centerlines 21*a* and 23*a*. Centerline 22*a* indicates the center 22 of magnet 20, and thus the center of a line between magnetic dipoles 21 and 23 of magnet 20. As discussed more fully hereinbelow, signal translating gaps 15 and 16 are separated by a distance substantially equal to the distance between magnetic dipoles 21 and 23 of magnet 20. Thus when sensing device 10 is centered with respect to magnet 20, as shown in FIG. 1, gap 15 is centered adjacent magnetic dipole 21 of magnet 20 and gap 16 is centered adjacent magnetic dipole 23.

For position sensing purposes, relative motion is imparted between sensing device 10 and magnet 20 in a direction perpendicular to the width of gaps 15 and 16. The width of gaps 15 and 16 is considered herein to be the dimension of the gaps measured into the drawing in FIG. 1. Thus, for purposes of describing the operation of FIG. 1, magnet 20 may be assumed to be in a stationary position and sensing device 10 may be assumed to move adjacent thereto in the direction indicated by the arrow. As sensing device 10 moves longitudinally in the direction indicated, a given point on magnet 20 is adjacent each of signal translating gaps 15 and 16 in succession. Therefore, each signal translating gap 15 and 16 of sensing device 10 passes adjacent first one of magnetic dipoles 21 and 23 of magnet 20 and then adjacent the other of magnetic dipoles 21 and 23, thereby inducing three successive pulses of alternating polarity in the output winding connected to terminals 19.

Figures 2A, 2B, 2C:
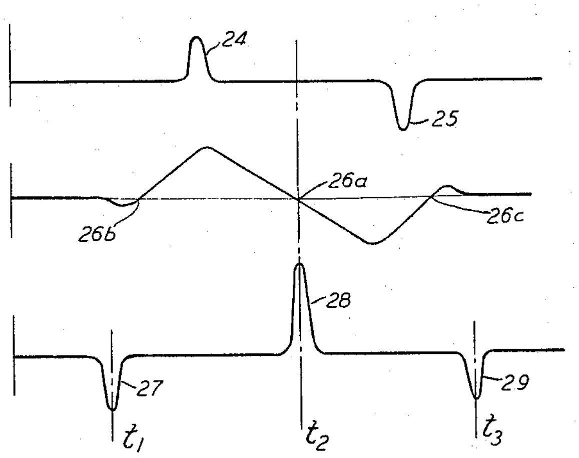
FIGS. 2A, 2B and 2C are graphical representations illustrating the operation of the embodiment of FIG. 1.

A graphical representation of the output signal appearing at terminals 19 during position-sensing operation is illustrated in FIG. 2C. Assume that prior to time $t_1$, sensing device 10 is approaching magnet 20 from the left in FIG. 1 of the drawing, moving in the direction assumed above. At time $t_1$ signal translating gap 16 passes adjacent magnetic dipole 21 of magnet 20, thereby inducing pulse 27 in signal translating coil 18 of the output winding. At time $t_2$ signal translating gap 16 passes adjacent magnetic dipole 23 and, concurrently, signal translating gap 15 passes adjacent magnetic dipole 21. Pulse 28 appearing at terminals 19 at time $t_2$, therefore, is a combination of the signals induced in coils 17 and 18 by the magnet flux coupling of gaps 15 and 16, respectively, and is opposite in polarity to pulse 27. Thus, the magnitude of pulse 28 is approximately twice that of pulses 27 and 29. Pulse 29 is induced in coil 17 of the output winding at time $t_3$, that is, when signal translating gap 15 passes adjacent magnetic dipole 23 of magnet 20.

Accordingly, when signal translating gaps 15 and 16 of sensing device 10 are respectively adjacent magnetic dipoles 21 and 23 of magnet 20, a position-indicating pulse, pulse 28, of predetermined polarity is induced in the output winding connected to terminals 19. Pulse 28 is thus derived jointly from both magnetic dipoles 21 and 23 of magnet 20, thereby accurately locating the center of magnet 20 independently of the individual edges thereof. This precludes error due to minor variations in the length of magnet 20 which may occur due to the edges being worn away or the like. Further, inasmuch as pulse 28 is opposite in polarity to pulses 27 and 29, a position indication may be readily derived therefrom by simple amplitude-detection circuitry responsive to the predetermined polarity of pulse 28.

FIG. 2A illustrates, by way of comparison, the output signal which would appear at terminals 19 if sensing device 10 had only two leg members, such as leg members 12 and 13, defining a single narrow signal translating gap similar to gap 15. A first pulse, pulse 24, appears at terminals 19 as the single gap passes adjacent magnetic dipole 21 of magnet 20; and a pulse of opposite polarity, pulse 25, appears at terminals 19 as the gap passes adjacent magnetic dipole 23. No signal is provided to indicate accurately the center of magnet 20, but rather pulses 24 and 25 are each related to the individual edges of the magnet. The accuracy of a position indication derived from pulses 24 and 25 is thus seriously affected by variations in magnet length which may occur during the construction of magnet 20 or through subsequent wear.

FIG. 2B illustrates the output signal which would appear at terminals 19 if sensing device 10 did not include leg member 13; that is to say, if sensing device 10 comprised only two leg members, such as leg members 12 and 14, defining a single signal translating gap having a spacing equal to the distance between magnetic dipoles 21 and 23 of magnet 20. No pulse is provided at terminals 19 to indicate the center of magnet 20, but axis crossing **26*a* occurs when such a sensing device is centered over magnet 20. However, axis crossings also occur at 26*b* and 26*c*. Moreover, the slope of axis crossing 26*a*** is relatively flat, making accurate detection thereof difficult and requiring rather complex detection circuitry.

As mentioned above, a sensing device in accordance with the principles of my invention may be employed advantageously in position sensing apparatus for recording systems of the type shown in the Ault-Friedman-Granger-Madden application, wherein information is stored on magnet cards for use in memory circuit arrangements of the type disclosed in the above-mentioned article and in the S. M. Shackell application. An illustrative embodiment of such position sensing apparatus is shown in block diagram form in FIG. 3.

Figure 3:
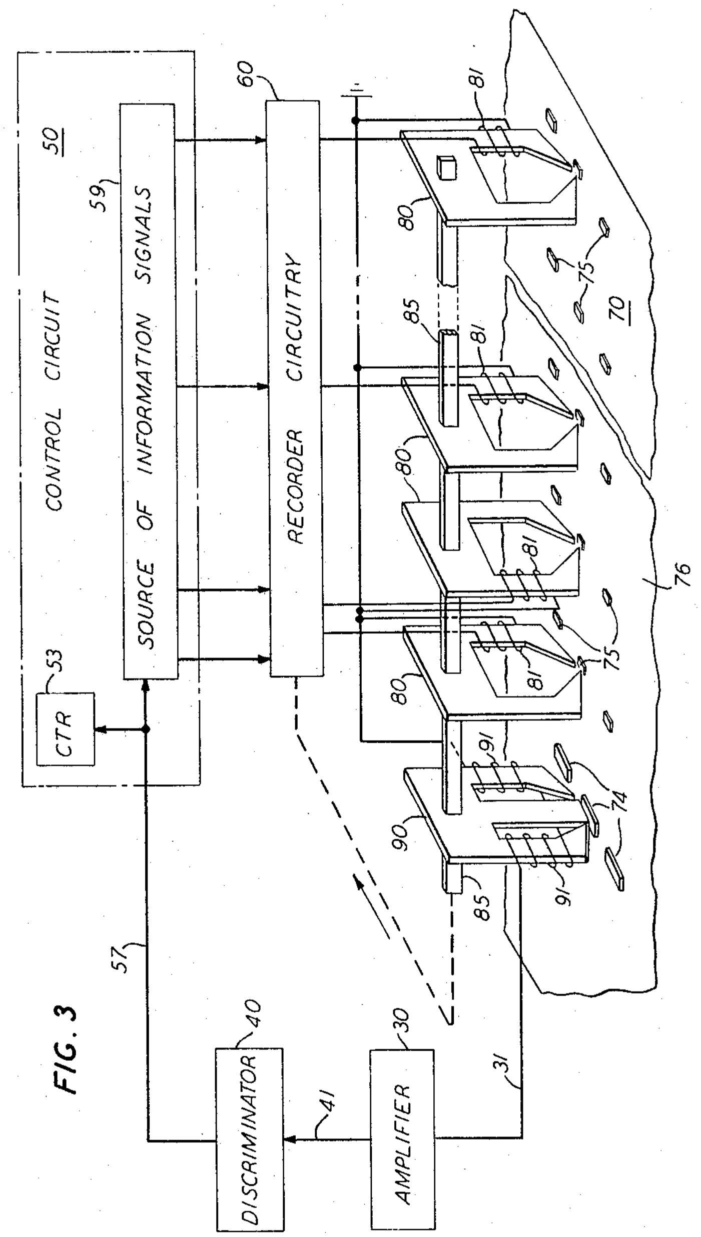
FIG. 3 shows an illustrative embodiment of position sensing apparatus in accordance with the principles of our invention employing the sensing device of FIG. 1.

A representation of a portion of a magnet card 70 is shown in FIG. 3 comprising a nonmagnetic sheet 76 having a plurality of positioning bar magnets 74 and a plurality of binary bit magnets 75 bonded or deposited thereon. The bit magnets 75 are arranged in rows and columns, each row corresponding to a word of information. An individual positioning magnet 74 is accurately located adjacent to and is associated with each respective row of bit magnets 75, positioning magnets 74 being arranged in a column parallel to the columns of bit magnets 75. Bit magnets 75 are selectively magnetized to record information on magnet card 70. For this purpose, assume that magnet card 70 remains stationary and that a plurality of recording heads 80 disposed on mounting rod 85 move with respect thereto, each recording head 80 moving adjacent a column of bit magnets 75. Thus a particular bit magnet 75 in a row may be magnetized by applying a recording signal to winding 81 of a recording head 80 when it is adjacent to the particular bit magnet 75.

To insure that the recording signals are applied to windings 81 only when recording heads 80 are accurately positioned with respect to bit magnets 75, position sensing apparatus is provided. In accordance with the principles of our invention the position sensing apparatus derives an accurate position indication from the individual positioning magnets 74 associated with each row of bit magnets 75. Sensing device 90, which is substantially similar to sensing device 10 in FIG. 1, is in a fixed positional relationship with recording heads 80, such as being rigidly mounted therewith on mounting rod 85. Sensing device 90 moves adjacent the column of positioning magnets 74 as recording heads 80 move adjacent the columns of bit magnets 75. Apparatus for imparting movement to sensing device 90 and recording heads 80 is included in recorder circuitry 60. As sensing device 90 moves adjacent one of positioning magnets 74, a signal is induced in winding 91 similar to that shown in FIG. 2C and is applied via conductor 31 to the input of amplifier 30. Amplifier 30 is responsive to pulses of a predetermined polarity corresponding to the polarity of the pulses induced in output winding 91 when sensing device 90 is situated adjacent the center of a positioning magnet 74; i.e., pulse 28 in FIG. 2C.

Therefore, amplifier 30 detects and increases the magnitude of pulse 28 to a magnitude greater than a preselected magnitude and applies the amplified pulse via lead 41 to discriminator 40. Discriminator 40 may comprise simple amplitude detection circuitry responsive to signals greater than the preselected magnitude to provide a shaped pulse, or position indication, on lead 57 suitable for operating control circuit 50.

Control circuit 50 comprises a source of information signals 59, which may include any source presenting information signals to be recorded on magnet card 70. The signal translating windings 81 of each of recording heads 80 are connected to source 59 through recorder circuitry 60. Thus, responsive to a gating signal on lead 57, source 59 selectively energizes windings 81 in accordance with the information to be stored in a row of bit magnets 75. If the fixed positional relationship of sensing head 90 and recording heads 80 is such that when the position indication appears on lead 57 recording heads 80 are situated adjacent a row of bit magnets 75, then the position indication on lead 57 may be employed directly to gate the operation of source 59, as shown in FIG. 3. Otherwise, suitable delay circuitry may be interposed between source 59 and discriminator 40.

Each position indication pulse on lead 57 may be applied also to a counter 53 to provide an indication of the particular row of bit magnets 75 which recording heads 80 is situated adjacent. Thus, the count in counter 53 advantageously indicates the position of recording heads 80 relative to an initial reference position.

It is to be understood that the above-described arrangements are merely illustrative of the application of the principles of the invention. Numerous other arrangements may be devised by those skilled in the art without departing from the spirit and scope of this invention.

What is claimed is:

1. A transducer for detecting the centerpoint of a line between a pair of opposite magnetic poles comprising three leg members of magnetic material defining two adjacent signal translating gaps separated by a distance substantially equal to the distance between said magnetic poles and single output circuit means operatively connected to both of said signal translating gaps for providing a maximum output signal level when said gaps are centered over said line centerpoint.

2. A device for sensing the center of a line between dipoles of a saturated magnetic material comprising three leg members of magnetic material defining two adjacent signal translating gaps separated by a distance substantially equal to the distance between said dipoles of said saturated magnetic material, means for imparting longitudinal movement to said gaps adjacent said line between said dipoles, and common output circuitry operatively connected to said gaps for providing a maximum output signal level when said gaps are centered over said line center.

3. Apparatus for sensing a position having a pair of magnetic dipoles associated therewith, the combination comprising a sensing device of magnetic material having three leg members, said leg members defining a pair of signal translating gaps, common output winding means operatively connected to both of said gaps, means for moving said sensing device such that said gaps each pass adjacent said dipoles in succession, thereby inducing a first signal in said output winding when one of said gaps is adjacent one of said dipoles and inducing a second greater signal in said output winding when said gaps are individually adjacent respective ones of said dipoles, and utilization means responsive to said second signal.

4. Position sensing apparatus comprising a magnet associated with a position to be sensed and having a pair of opposite magnetic poles separated by a predetermined distance, sensing means including a pair of signal translating gaps spaced apart a distance substantially equal to said predetermined distance, means for providing relative movement between said magnet and said sensing means in a direction such that said gaps are successively adjacent first one of said magnetic poles of said magnet and then the other of said magnetic poles, and means associated with each of said gaps operative in response to said relative movement to provide a maximum output signal when said gaps are each adjacent a respective one of said magnetic poles of said magnet.

5. Position sensing apparatus comprising a discrete cell of magnetic material having two magnetic poles separated by a predetermined distance, said magnetic poles each being accurately located with respect to a position to be sensed, a sensing device, said sensing device having three leg members of magnetic material defining two adjacent signal translating gaps, the distance between said adjacent gaps being substantially equal to said predetermined distance, means for moving said sensing device adjacent said discrete cell of magnetic material, and output means inductively coupled to each of said gaps and operative during said movement to provide a maximum output signal when said signal translating gaps are individually adjacent respective ones of said two magnetic poles.

6. In apparatus for sensing a position having a first and a second magnetic dipole associated therewith, the combination comprising a transducer having three leg members of magnetic material defining a first and a second signal translating gap, means for moving said transducer adjacent said first and second magnetic dipoles in succession, the direction of movement being substantially perpendicular to the width of said first and second signal translating gaps, and common output circuit means inductively coupled to said first and second signal translating gaps for providing a maximum output signal when both of said first and said second gaps are similarly positioned adjacent said first and second magnetic dipoles, respectively.

7. In position sensing apparatus in accordance with claim 6, the combination wherein said common output circuit means comprises first means inductively coupling said first gap for providing a first output signal when said first gap is adjacent said first magnetic dipole, second means inductively coupling said second gap for providing a second output signal when said second gap is adjacent said second magnetic dipole, and means including said first and second means for providing said maximum output signal when said first gap is adjacent said second magnetic dipole and, concurrently, said second gap is adjacent said first magnetic dipole.

8. In position sensing apparatus in accordance with claim 7 the combination wherein said common output circuit means further comprises utilization means responsive to said maximum output signal.

9. A magnetic sense transducer for sensing the position of a discrete cell of magnetic material including a pair of magnetic poles separated by a predetermined distance along a track, said transducer comprising three leg members of magnetic material, means for positioning said leg members to define a pair of signal translating gaps separated by said predetermined distance along said track, means for moving said transducer along said track, and means operatively connected to said gaps for providing a maximum output signal when said gaps are both adjacent said discrete cell.

References Cited by the Examiner

UNITED STATES PATENTS

| | | | |
|---|---|---|---|
| 2,679,620 | 5/1954 | Berry | 340—174.1 |
| 2,782,989 | 2/1957 | Knox | 179—100.2 |
| 2,866,855 | 12/1958 | Forest | 179—100.2 |
| 2,961,645 | 11/1960 | Dickinson | 340—174.1 |
| 3,068,386 | 12/1962 | Jaeger | 340—196 |
| 3,092,815 | 6/1963 | Hinze | 346—74 |
| 3,126,535 | 3/1964 | Streeter | 340—174.1 |
| 3,150,358 | 9/1964 | Newman et al. | 340—174.1 |
| 3,176,241 | 3/1965 | Hogan | 340—174.1 |
| 3,239,823 | 3/1966 | Chang | 340—174.1 |

JAMES W. MOFFITT, *Acting Primary Examiner.*

TERRELL W. FEARS, THOMAS B. HABECKER, *Examiners.*

V. P. CANNEY, *Assistant Examiner.*